(12) United States Patent
Lee et al.

(10) Patent No.: US 9,556,362 B2
(45) Date of Patent: Jan. 31, 2017

(54) RESIN-METAL COMPLEX AND MANUFACTURING METHOD THEREOF

(71) Applicant: WAPS. CO. LTD, Busan (KR)

(72) Inventors: Jae Choon Lee, Busan (KR); Sungmin Park, Seoul (KR); Sungshick Paik, Seoul (KR)

(73) Assignee: WAPS. CO. LTD, Busan (KR)

( * ) Notice: Subject to any disclaimer, the term of this patent is extended or adjusted under 35 U.S.C. 154(b) by 522 days.

(21) Appl. No.: 14/111,431

(22) PCT Filed: Jul. 18, 2013

(86) PCT No.: PCT/KR2013/006444
§ 371 (c)(1),
(2) Date: Oct. 11, 2013

(87) PCT Pub. No.: WO2014/073769
PCT Pub. Date: May 15, 2014

(65) Prior Publication Data
US 2014/0127435 A1  May 8, 2014

(30) Foreign Application Priority Data

Nov. 6, 2012  (KR) .................. 10-2012-0124807

(51) Int. Cl.
*C09D 197/02* (2006.01)
*B29C 39/10* (2006.01)
(Continued)

(52) U.S. Cl.
CPC ............. *C09D 197/02* (2013.01); *B29C 39/10* (2013.01); *B29C 47/0069* (2013.01); *B29C 47/021* (2013.01); *B29C 47/025* (2013.01); *B29C 47/1036* (2013.01); *B29C 47/882* (2013.01); *C08L 23/02* (2013.01); *C08L 97/02* (2013.01); *C09D 5/28* (2013.01); *C09D 7/1216* (2013.01); *C09D 123/02* (2013.01); *C09D 175/04* (2013.01); *B05D 3/142* (2013.01); *B05D 7/14* (2013.01); *B05D 2350/60* (2013.01);
(Continued)

(58) Field of Classification Search
CPC ... C09D 197/02; C09D 7/1218; C09D 123/02; C09D 5/28; C09D 175/04; B05D 3/142; B05D 7/14; B05D 2350/60; B29C 39/10; B29C 47/0069; B29C 47/021; B29C 47/025; B29C 47/1036; B29C 47/882; Y10T 428/1355; Y10T 428/21; Y10T 428/2419; Y10T 428/31692; C08L 23/02; C08L 97/02; C08L 2205/16; C08L 2205/18
See application file for complete search history.

(56) References Cited

U.S. PATENT DOCUMENTS 7,825,180 B2   11/2010  Syed et al.
2005/0058822 A1   3/2005  Ittel

FOREIGN PATENT DOCUMENTS

JP   2000-044809 A   2/2000
JP   2012-012684 A   1/2012

*Primary Examiner* — Michael C Miggins
(74) *Attorney, Agent, or Firm* — Rabin & Berdo, P.C.

(57) ABSTRACT

Provided herein is a resin-metal complex and a manufacturing method thereof, the resin-metal complex being a synthetic resin comprising an olefin resin, filler, and coupling agent combined with a metallic material, the filler being at least one of an organic filler and inorganic filler, the inorganic filler being wood flour, wood pellet, wood fiber, or paper powder, and the inorganic filler being talc, calcium carbonate, wollastonite, or kaolinite.

20 Claims, 2 Drawing Sheets

(51) Int. Cl.
  *C09D 7/12*     (2006.01)
  *C09D 123/02*   (2006.01)
  *C08L 23/02*    (2006.01)
  *C08L 97/02*    (2006.01)
  *B29C 47/00*    (2006.01)
  *B29C 47/02*    (2006.01)
  *B29C 47/10*    (2006.01)
  *B29C 47/88*    (2006.01)
  *C09D 5/28*     (2006.01)
  *C09D 175/04*   (2006.01)
  *B05D 3/14*     (2006.01)
  *B05D 7/14*     (2006.01)

(52) U.S. Cl.
  CPC ....... *C08L 2205/16* (2013.01); *C08L 2205/18* (2013.01); *Y10T 428/1355* (2015.01); *Y10T 428/21* (2015.01); *Y10T 428/2419* (2015.01); *Y10T 428/31692* (2015.04)

RESIN-METAL COMPLEX AND MANUFACTURING METHOD THEREOF

CROSS-REFERENCE TO RELATED APPLICATIONS

This application is a national stage application of PCT/KR2013/006444 filed on Jul. 18, 2013, the disclosure of which is incorporated by reference herein.

BACKGROUND

1. Field

The following description relates to a resin-metal complex and a manufacturing method thereof, for example, to a resin-metal complex where a resin comprising an olefin resin, filler, and coupling agent is combined with a metallic material, and a method for manufacturing the same in a series of sequential process of preparing a uniformly-shaped metallic material, chemically processing the surface of the metallic material, and coating the chemically processed metallic material with a synthetic resin in an extrusion method in such a manner that the coated layer has a thin and uniform thickness.

2. Description of Related Art

Wood Plastic Composite (WPC) profile extruded products manufactured by mixing wood and plastic are drawing much attention as exterior and interior building materials in the building supplies field.

Due to the large amount of fillers that account for 60% or more in a WPC, the strength of WPCs increased, but its specific gravity also increased, thereby increasing the weight as well. In order to supplement this disadvantage, efforts were made to design various hollow shaped WPCs to lighten the weight. However, hollow shaped WPCs increased the cross-sectional size area thereof, making the WPCs vulnerable to moisture; and during construction, when there is impact, the load concentrated on the relatively thinner sides created cracks or holes when there is impact, thereby damaging the WPCs.

In order to improve these problems, products such as fences, pillars or louvers were manufactured in such a manner that c-channels or square pipes having hollow interior may be inserted therein, but these were not economical since it increased production costs. Furthermore, when the inner sizes are not precious, it is difficult to insert c-channels or square pipes into the products, breaking the WPCs. In addition, since synthetic wood is not closely adhered to the inner metallic layer, a certain thickness of 10 mm or more must be formed according to the usage of products in order to manufacture a wood metallic complex having a certain strength, which increases the weight and decreases the economic feasibility. Besides, there is a need to combine various kinds of resins to create a complex that may be used in various types of construction materials suitable for various uses.

SUMMARY

Therefore, a purpose of the present disclosure is to resolve the aforementioned conventional problems, in particular, regarding combining a resin comprising an organic filler, inorganic filler, and coupling agent with a metallic material, to provide a resin-metal complex that has an excellent adhesiveness and that may embody various shapes.

Another purpose of the present disclosure is to resolve the aforementioned conventional problems, in particular, regarding an integrated process for manufacturing a final resin-metal complex from a metallic material having a certain shape, to provide a method for manufacturing a resin-metal complex comprising a step of processing the surface of a metallic material to improve the adhesiveness with the synthetic by adjusting the state of the surface of the metallic material in a plasma processing or using a primer. Furthermore, another purpose of the present disclosure is to provide a light-weight yet strong synthetic resin having excellent durability by optimizing the synthetic resin pellet and extrusion conditions during a melt extrusion.

In one general aspect, there is provided a resin-metal complex where a synthetic resin comprising an olefin resin, filler, and coupling agent is combined with a metallic material, wherein the filler being at least one of an organic filler or inorganic filler, the organic filler selected from wood flour, wood pellet, wood fiber, and paper powder, or any combination thereof, and the inorganic filler selected from talc, calcium carbonate, wollastonite, and kaolinite, or any combination thereof. On the basis of 100 parts by weight of the olefin resin, the filler may be 1 to 100 parts by weight, and the coupling agent may be 0.1 to 10 parts by weight.

The coupling agent may be a silane resin or modified maleic anhydride resin, the synthetic resin may further comprise additive(s), the additive(s) being a photostabilizer, antioxidant, ultraviolet ray absorbent, or lubricant, or any combination thereof.

The metallic material may be aluminum, iron, copper, chromium, nickel, silicon, manganese, tungsten, zinc, or magnesium, or any combination thereof, and the metallic material may be a circle, oval, triangle, square, pentagon, hexagon, heptagon, of a ㄱ shape or ㄷ shape, or an open pillar having 3 to 10 vertexes.

In another general aspect, there is provided a method for manufacturing a resin-metal complex, the method comprising: preparing a metallic material; processing a surface of metallic material; melting and extruding a synthetic resin pellet to prepare a synthetic resin coating solution; coating a surface of the metallic material with the synthetic resin coating solution to form a resin-metal complex; and cooling the resin-metal complex.

At the preparing a metallic material, a metallic material may be aluminum, iron, copper, chrome, nickel, silicon, manganese, tungsten, zinc, or magnesium or any combination thereof, and a metallic material may be formed by roll-foaming a metallic panel so that a cross section of the metallic material is a circle, oval, triangle, square, pentagon, hexagon, or heptagon, of a ㄱ shape or ㄷ shape, or an open pillar having 3 to 10 vertexes.

The processing a surface of the metallic material may have a surface treatment comprising plasma treatment or a primer application.

At the extruding, the synthetic resin pellet may be made to comprise an olefin resin, filler, and coupling agent, the filler may be at least one of an organic filler or inorganic filler, the organic filler selected from wood flour, wood pellet, wood fiber, and paper powder, or any combination thereof, the inorganic filler selected from talc, calcium carbonate, wollastonite, and kaolinite, or any combination thereof, and the coupling agent being a silane resin or modified maleic anhydride resin.

At the coating, a mold may be used for depositing the synthetic resin coating solution on the surface of the metallic material, and at the coating, the synthetic resin coating solution may be deposited on the surface of the metallic material to form a thickness of 0.5 to 7.0 mm.

At the cooling, the resin-metal complex may be cooled under an atmosphere of 5 to 50° C. for 0.5 to 10 minutes, and embossing a pattern(s) on the surface of the resin-metal complex may be further provided.

According to the present disclosure, it is possible to firmly combine a resin comprising an olefin resin, an optimal amount of filler and coupling agent with a metallic material, thereby providing a resin-metal complex that may embody various shapes and has excellent durability.

Furthermore, according to the present disclosure, in manufacturing a resin-metal complex where a metallic material is combined with a synthetic resin, it is possible to manufacture a finished product having a desired shape and thickness in a sequential process from an initial processing stage to a finished product.

In addition, according to the present disclosure, in depositing a synthetic resin coating solution, it is possible to adjust the surface state of the metallic material by a plasma-processing or depositing a primer thereon, and the synthetic resin may include a silane coupling agent having an optimal viscosity, which may increase the adhesive strength, enabling depositing the synthetic resin coating solution evenly on the metallic material.

Figure 1:
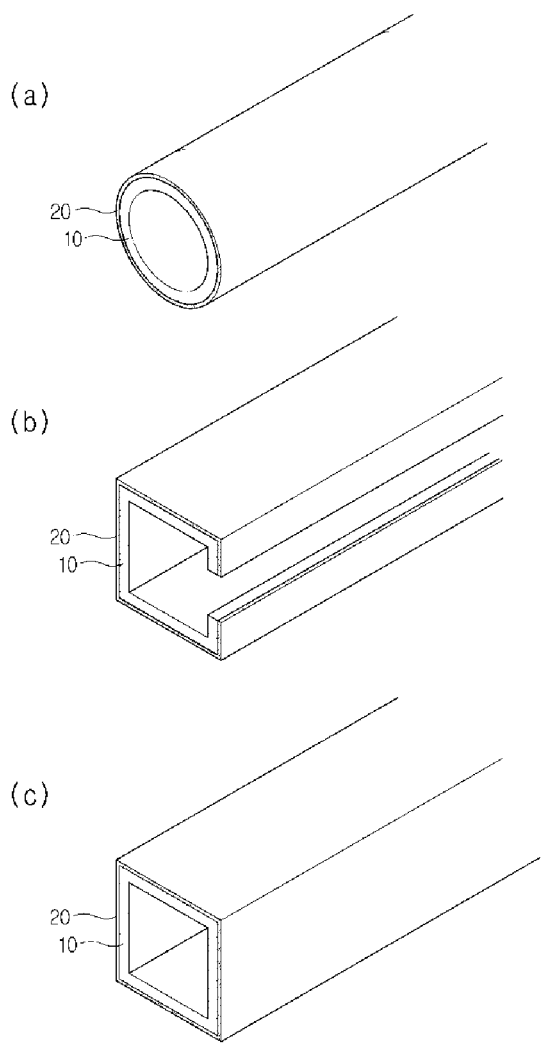
FIG. 1 is a view illustrating a resin-metal complex according to an exemplary embodiment of the present disclosure.

Throughout the drawings and the detailed description, unless otherwise described, the same drawing reference numerals will be understood to refer to the same elements, features, and structures. The relative size and depiction of these elements may be exaggerated for clarity, illustrating, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

The present disclosure relates to a resin-metal complex where a resin comprising an olefin resin, filler and coupling agent is combined with a metallic material. The filler may be at least one of an organic filler or an inorganic filler, wherein the organic filler may desirably be selected from wood flour, wood pellet, wood fiber, and paper powder, or any combination thereof, while the inorganic filler may desirably be selected from talc, calcium carbonate, wollastonite, and kaolinite, or any combination thereof.

An extruded product may be produced by reforming the wood pellet, wood fiber, or paper powder, but in that case the durability will decrease and it would be difficult to manufacture an extruded product in various shapes as mentioned above. Therefore, by combining an extruded product with a metallic material as in the present disclosure, it is possible to manufacture a strong construction material that has a surface suitable to various uses. Furthermore, due to the inorganic filler such as talc, calcium carbonate, wollastonite, and kaolinite, the properties of resin may be improved. That is, the aforementioned inorganic fillers do not absorb moisture, but increases the surface activation effect to improve the contraction prevention efficiency, and significantly improves the moldability when manufacturing a synthetic resin. Therefore, it is possible to use an organic filler and an inorganic filler in combination depending on the usage of the resin-metal complex and the type of the metal.

On the basis of 100 parts by weight of the olefin resin, the filler may desirably be 1 to 100 parts by weight, and the coupling agent may desirably be 0.1 to 10 parts by weight. The problem of filler is that if it is less than 1 parts by weight, its strength and adhesiveness would fall significantly, making it difficult to be combined with a metallic material. On the other hand, if the filler exceeds 100 parts by weight, its strength would increase, but it would be difficult to deposit a thin resin on the metallic material. If the coupling agent is less than 0.1 parts by weight, its adhesiveness would deteriorate, thereby reducing the adhesion between the materials inside the resin and the elasticity, whereas if the coupling agent exceeds 10 parts by weight, the extent of extrusion would decrease.

The coupling agent may desirably be a silane resin or modified maleic anhydride resin. Silane resin or modified maleic anhydride resin may prevent deterioration of the strength of a product caused by the mass amount of organic filler and olefin resin used, and may enable manufacturing a composition having the elasticity and strength of natural wood. Silane resin may desirably be at least one selected from amino silane, epoxy silane, mercapto silane, ureido silane, methacryloxy silane, vinyl silane, glycidoxy silane, and sulphido silane.

The synthetic resin may further comprise an additive(s), that may desirably be a photostabilizer, antioxidant, ultraviolet ray absorbent, or lubricant, or any combination thereof. Any of these additives may be used as long as it is generally used in the related field.

More specifically, the photostabilizer may desirably comprise bis-2,2,6,6-tetrametyl-4 piperidyl group. By adding a photostabilizer, it is possible to prevent the durability from decreasing and bleaching when the olefin resin or synthetic resin is exposed to ultraviolet ray. Phosphate antioxidant, phenol antioxidant, and or calcium monostearate antioxidant may desirably be used as the antioxidant, while benzotriazol antioxidants may desirably be used as the ultraviolet ray absorbent. This may improve the durability of the resin-metal complex. In addition, the lubricant may desirably be an ester lubricant or amide lubricant, more desirably polyethylene wax or polypropylene wax. The lubricant provides lubricity between each component and reduces the frictional force to improve the dispersion of the filler.

The metallic material may desirably be aluminum, iron, copper, chromium, nickel, silicon, manganese, tungsten, zinc, or magnesium, or any combination thereof, more desirably iron, and most desirably stainless steel containing a certain amount of chromium so as to prevent corrosion. The metallic material may be of any shape, but may desirably have a structure where the cross-section is closed by a circle, oval, triangle, square, pentagon, hexagon, heptagon, is of a ⊓ shape or ⊏ shape, or is of an open pillar having 3 to 10 vertexes.

In FIG. 1, (a) illustrates a case where a synthetic resin 20 is combined on a metallic material 10 having a circular cross section, (b) illustrates a case where a synthetic resin 20 is combined on a metallic material 10 having a C-shaped cross section, and (c) illustrates a case where a synthetic resin 20 is combined on a metallic material 10 having a square cross section. In the case of a closed metallic material, the center of the metallic material 10 may be empty as in (a) or (c).

The synthetic resin 20 may have a thickness of 0.5 to 7.0 mm, more desirably 0.5 to 3.0 mm.

The resin-metal complex is not limited to the shape as illustrated in FIG. 1, but may be embodied in various shapes depending on the usage.

Figure 2:
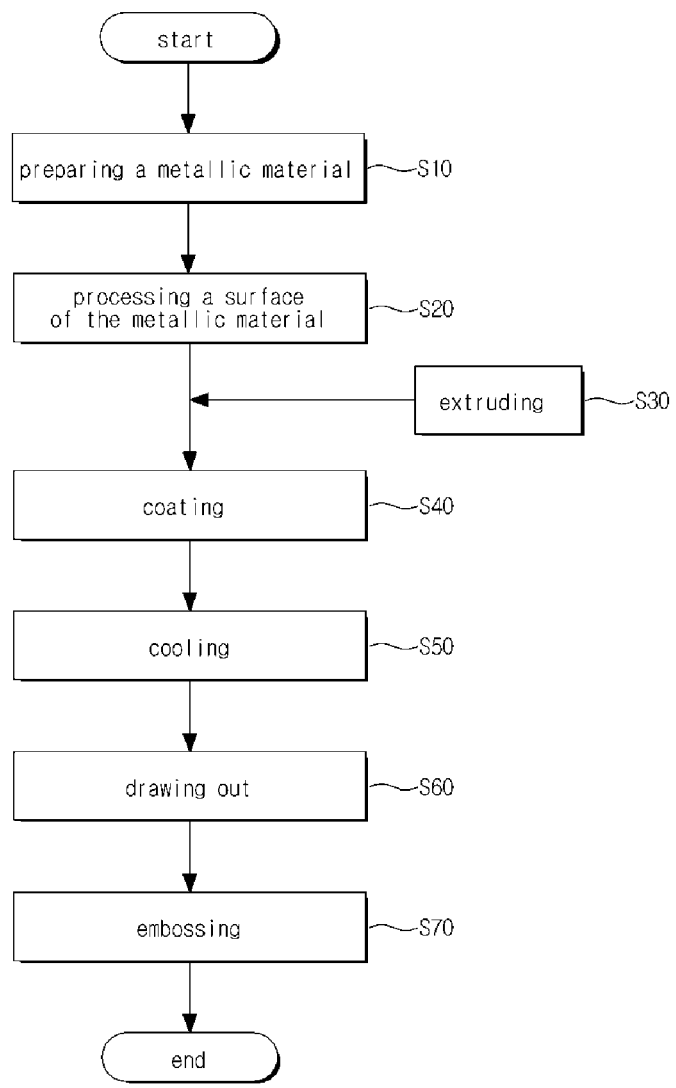
FIG. 2 is a flowchart of a method for manufacturing a resin-metal complex according to an exemplary embodiment of the present disclosure.

Furthermore, the present disclosure relates to a method for manufacturing a resin-metal complex, more particularly a manufacturing method optimized to a synthetic resin-metal complex. As in FIG. 2, the resin-metal complex is manufactured by preparing a metallic material (S10), processing a surface of the metallic material (S20), extruding (S30), coating (S40), and cooling (S50).

The preparing a metallic material (S10) is a step for preparing a metallic material to be disposed inside the resin-metal complex, that maintains the strength of the finally manufactured resin-metal complex high. Unlike the conventional methods of inserting c-channels or square pipes inside to produce an integrated product of metal and resin such as WPCs, in the method according to the present disclosure, a metallic material is manufactured first and thus it is possible to embody various shapes of resin-metal complex having excellent durability.

The metallic material may desirably be aluminum, iron, copper, chrome, nickel, silicon, manganese, tungsten, zinc, or magnesium, or any combination thereof, more desirably iron, and most desirably a stainless steel having a certain amount of chrome to prevent corrosion.

Metal may be provided in forms of metallic material, metallic panels or rolls, and may receive a roll-foaming molding so that it could be folded in certain shapes to form desirable shapes. The metallic material may have any shape, but may desirably have a structure where the cross-section is closed by a circle, oval, triangle, square, pentagon, hexagon, or heptagon, of a ㄱ shape or ㄷ shape, or of an open pillar having 3 to 10 vertexes.

The processing the surface of a metallic material (S20) is a step for processing the surface of the metallic material that is created by roll foaming molding. In this step, a surface processing is performed for depositing a thin synthetic resin coating solution to create a uniform thickness over the surface of the metallic material. The surface of the metallic material may receive plasma treatment or may be coated with a primer for a firm adhesion between the synthetic resin coating solution and the metallic material.

The plasma treatment may be performed in a conventional method, but may desirably be performed under the atmosphere of solely argon and pressure of $10^{-2}$ torr or below, or under the atmosphere of oxygen or nitrogen on top of the argon. That is because, if the plasma processing is performed under a higher pressure, arc discharge may occur due to impurities.

A primer is for facilitating adhesion between the metallic material and synthetic resin coating solution. A small amount may be applied. The primer is a composition comprising a thermosetting resin and a thermoplastic resin. Generally, a thermoplastic resin has a low heat-resistant temperature, an excellent adhesiveness with resin but not with metal, whereas a thermosetting resin has a high heat-resistance temperature, and an excellent adhesiveness with metal and thermosetting resins but not with thermoplastic resins. Therefore, it is desirable to use a primer composed by mixing a thermosetting resin therein, more specifically, on the basis of 100 parts by weight of thermosetting resin, 100 parts by weight of thermoplastic resin is effective. Epoxy resin or melamine resin may desirably be used as a thermosetting resin, while methyl-cellulose or polyvinyl acetate resin may desirably be used as a thermoplastic resin.

Together with the aforementioned chemical processing, it is possible to maximize the adhesiveness by performing a physical processing of adjusting the roughness of the surface. The average roughness (Ra) of the central line of the metallic material surface according to the present disclosure may desirably be 0.5 to 10 μm, and the maximum height (Rmax) may desirably be 20 to 50 μm. Otherwise, that is, if the average roughness of the central line of the metallic material surface and the maximum height thereof are outside the aforementioned ranges, for example, when the roughness of the surface of the metallic material is small, the adhesiveness with the resin coating solution will deteriorate, making it difficult to deposit a thin resin coating solution, and when the roughness of the surface of the metallic material is too great, the coating will be not be made smoothly thereby deteriorating the appearance. There is no limitation in the method of surface processing, but it is desirable to use turning, milling, grinding, lapping or honing.

The extruding (S30) is for preparing a synthetic resin coating solution to be deposited on the metallic material. It is a step for melting and extruding synthetic resin pellet and preparing a synthetic resin coating solution.

The synthetic resin may desirably comprise an olefin resin, filler, and coupling agent, wherein the filler may desirably be at least one of an organic filler or inorganic filler, the organic filler may desirably be selected from wood flour, wood pellet, wood fiber and paper powder, or any combination thereof, the inorganic filler may desirably be selected from talc, calcium carbonate, wollastonite, and kaolinite, or any combination thereof, and the coupling agent may desirably be silane resin or modified malice anhydride resin. Especially, in the manufacturing method of the present disclosure, in the case of using organic fillers such as wood flour, wood pellet, or wood fiber, it is desirable to use wood flour, olefin resin and coupling agent.

Regarding the organic filler, wood flour, there is no limitation to its type. It is regardless whether the wood flour is broadleaf tree wood flour or needleleaf tree wood flour, but broadleaf tree wood flour has a bigger specific gravity than needleleaf tree wood flour, and it is possible to manufacture uniform particles with broadleaf tree wood flour, and thus broadleaf tree wood flour is more desirable. Due to these characteristics, it is possible to deposit a thin synthetic resin coating solution with broadleaf tree wood flour. It is desirable to use wood flour having 10 to 200 mesh particle size and a percentage of water content of less than 8%. Using wood flour having a percentage of water content that exceeds 8% would reduce mechanical properties and productivity.

Olefin resin refers to polypropylene (PP), polyethylene (ethylene polymers such as HDPE, LDPE, or LLDPE), copolymer thereof or mixture of those polymers. Olefin resin is stronger against external impact than other resins, and thus it is possible to manufacture high strength resin with olefin resin.

It is desirable to include a coupling agent to increase the adhesiveness between olefin resin and filler. It is desirable to use silane resin or modified maleic anhydride resin as a coupling agent, which shows excellent performance in combining olefin resin with fillers. It is desirable that the viscosity of a coupling agent is 20,000 to 25,000 cps. If the viscosity of the coupling agent is less than 20,000 cps, the strength would not increase so much making it difficult to deposit a thin resin coating, whereas if the viscosity of the coupling agent exceeds 25,000 cps, synthetic resin would peel off from the surface of the metallic material, significantly deteriorating the durability of the product.

It is desirable that the synthetic resin comprises a photo-stabilizer, antioxidant, ultraviolet ray absorbent, or lubricant, or any combination thereof as an additive, wherein the ratio of each additive should be the same.

It is desirable that on the basis of 100 parts by weight of olefin resin, filler is 1 to 100 parts by weight, coupling agent 0.1 to 10 parts by weight, and additive 5 to 20 parts by weight.

The extrusion is most effective when the diameter of the synthetic pellet has a fixed value between 2 to 5 mm. Otherwise, when the pellet has different shapes having a diameter outside the above range, inconsistent amount of raw material would be supplied to the screw, deteriorating extrusion.

The extrusion process which is an important process in producing a good synthetic resin coating solution starts as pellet enters the dorsal of the screw through a hopper. Due to the nature of wood lour, it has a low specific gravity and carbonizing point and the inner structure of wood flour is weak to the extreme shear stress in an extrusion process, and thus it is desirable that the diameter of the screw is 20 to 100 mm. When using a screw of the aforementioned diameter range, optimal mulling and minimum shear-stress could be maintained, thereby creating an optimal extrusion state for synthetic resin pellet having the diameter between 2 to 5 mm.

Furthermore, it is desirable that the extrusion velocity is 1 to 10 m/min, more desirably 2 to 5 m/min. When the extrusion velocity is less than 1 m/min, the outer surface of the profile being manufactured may peel off or curve, decreasing the economic feasibility, whereas when the extrusion velocity exceeds 10 m/min, it may be difficult to control the production conditions, resulting in irregular coating on the products.

The coating step (S40) is a step for forming a resin-metal complex. At this step, on the metallic material produced through the step for preparing a metallic material (S10) and the step for processing a surface of the metallic material (S20), the synthetic resin coating solution produced through the extruding step is deposited.

For the deposition, the metallic material is transferred to a mold in a longitudinal direction and is inserted, and then the synthetic resin coating solution produced through the step of extruding (S30) is deposited to have a thin thickness on the metallic material. Accordingly, a resin-metal complex is formed. The mold may be manufactured differently according to the depositing thickness of the synthetic resin coating. In the case of the present disclosure, since there is a high strength metallic material in the inside, and the state of the surface of the metallic material is adjusted by conducting a plasma processing or a process of depositing a primer, and the adhesiveness is enhanced by optimizing the composition of the synthetic resin, the synthetic resin coating solution may be deposited to have a thin thickness unlike in the conventional methods. Therefore, the synthetic resin coating solution may be deposited to have a thickness of 0.5 to 7.0 mm, more desirably 0.5 to 3.0 mm.

The step of cooling (S50) is a step for cooling the resin-metal complex under an atmosphere of 5 to 50° C. for 0.5 to 10 minutes since the synthetic resin coating solution was deposited while it was at a melted and extruded state. If the cooling temperature is less than 5° C., cracks may occur on the deposited synthetic resin, and if the cooling temperature exceeds 50° C., the cooling temperature is too high and would thus decrease economic feasibility due to excessive cooling time. It is desirable to use a cooling tank as a cooling device, and it is fine to use a air-cooling method.

After the step of cooling (S50), a step for drawing out (S60) may be further included. And it is desirable to further include a step of embossing (S70) for refining the surface and a step of cutting (S80) for cutting the produced resin-metal complex in necessary lengths. It is possible to form various patterns on the resin-metal complex, especially, wood grain patterns in order to give the texture of an actual tree. Herein, for the embossing for forming the patterns, a deep embossing may be made under a high pressure. It is difficult to perform an embossing on a conventional material made of only WPC since its strength is weaker than the resin-metal complex according to the present disclosure, And in the case of inserting a square tube, continuously producing is not possible.

As such, according to the present disclosure, it is possible to manufacture a resin-metal complex in a sequential process from the initial stage of processing to the finished product through the preparing a metallic material (S10), processing a surface of the metallic material (S20), extruding (S30), coating (S40), cooling (S50), drawing out (S60), embossing (S70), and cutting (S80), and further, it is possible to fuse and produce materials of different type efficiently, thereby reducing the production cost. Furthermore, according to the present disclosure, users may use products of optimized shapes and thickness without using the inefficient methods of using conventional metallic square tubes or c-channels.

In addition, the present disclosure relates to a resin-metal complex manufactured by the aforementioned method. Conventional materials made of only WPC have weak strength and are vulnerable to ultraviolet ray, and thus when exposed to the sun for a long time, the color of the surface changes, and the material properties deteriorate, thereby decreasing the durability. However, a resin-metal complex according to the manufacturing method of the present disclosure may have excellent properties and durability as a metallic material is coated with a synthetic resin.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

INDUSTRIAL AVAILABILITY

By coating a metallic material with a synthetic resin, there is provided a resin-metal complex having excellent properties and durability. Furthermore, according to the manufacturing method of a resin-metal complex of the present disclosure, it is possible to manufacture a resin-metal complex where a synthetic resin is deposited on a metallic material, and optimize the state of the surface of the metallic material and composition of the synthetic resin so as to provide a resin-metal complex having excellent durability and strength, and provide an optimized and desired shape and thickness of the synthetic resin coating in the sequential process.

What is claimed is:

1. A resin-metal complex, comprising:
a metallic material; and
a synthetic resin combined with the metallic material, the synthetic resin including an olefin resin, a filler and a coupling agent,
wherein the metallic material is configured to have a cross section of a hollow circle shape, a hollow oval shape, a hollow triangle shape, a hollow square shape, a hollow pentagon shape, a hollow hexagon shape, a hollow heptagon shape, a ⌐ shape, a ⊏ shape, or an open polygon shape that has 3 to 10 vertexes,
wherein the cross section of the metallic material includes an outer surface and an inner surface opposite to the outer surface, the inner surface being apart from the outer surface by a thickness of the metallic material,
wherein a primer is applied on the outer surface of the metallic material,
wherein the synthetic resin is coated on the primer and the outer surface of the metallic material, without being coated on the inner surface,
wherein the filler is at least one of an organic filler or an inorganic filler, the organic filler selected from wood flour, wood pellet, wood fiber, and paper powder, or any combination thereof, and the inorganic filler selected from talc, calcium carbonate, wollastonite, and kaolinite, or any combination thereof.

2. The resin-metal complex according to claim 1, wherein the synthetic resin further comprises additive(s), the additive(s) being a photostabilizer, antioxidant, ultraviolet ray absorbent, or lubricant, or any combination thereof.

3. The resin-metal complex according to claim 1, wherein the metallic material is aluminum, iron, copper, chromium, nickel, silicon, manganese, tungsten, zinc, and magnesium, or any combination thereof.

4. The resin-metal complex according to claim 1, wherein on the basis of 100 parts by weight of the olefin resin, the filler is 1 to 100 parts by weight, and the coupling agent is 0.1 to 10 parts by weight.

5. The resin-metal complex according to claim 4, wherein the synthetic resin further comprises additive(s), the additive(s) being a photostabilizer, antioxidant, ultraviolet ray absorbent, or lubricant, or any combination thereof.

6. The resin-metal complex according to claim 1, wherein the coupling agent is a silane resin or a modified maleic anhydride resin.

7. The resin-metal complex according to claim 6, wherein the synthetic resin further comprises additive(s), the additive(s) being a photostabilizer, antioxidant, ultraviolet ray absorbent, or lubricant, or any combination thereof.

8. The resin-metal complex according to claim 1, wherein the primer is a mixture of a thermosetting resin and a thermoplastic resin.

9. The resin-metal complex according to claim 8, wherein the primer includes 100 parts by weight of the thermosetting resin and 100 parts by weight of the thermoplastic resin.

10. A method for manufacturing a resin-metal complex, the method comprising:
preparing a metallic panel or roll;
folding the metallic panel or roll to have a cross section of a hollow circle shape, a hollow oval shape, a hollow triangle shape, a hollow square shape, a hollow pentagon shape, a hollow hexagon shape, a hollow heptagon shape, a ⌐ shape, a ⊏ shape, or an open polygon shape that has 3 to 10 vertexes, wherein the cross section of the folded metallic panel or roll includes an outer surface and an inner surface opposite to the outer surface, the inner surface being apart from the outer surface by a thickness of the metallic material;
processing the outer surface of metallic material by a plasma treatment or a primer application;
melting and extruding a synthetic resin pellet to prepare a synthetic resin coating solution;
coating the outer surface of the metallic material with the synthetic resin coating solution to form a resin-metal complex, without coating the inner surface of the metallic material; and
cooling the resin-metal complex.

11. The method according to claim 10, wherein the metallic material at the preparing a metallic material is aluminum, iron, copper, chrome, nickel, silicon, manganese, tungsten, zinc, or magnesium, or any combination thereof.

12. The method according to claim 10, wherein at the extruding, the synthetic resin pellet is made to comprise an olefin resin, a filler, and a coupling agent,
the filler is at least one of an organic filler or an inorganic filler, the organic filler selected from wood flour, wood pellet, wood fiber, and paper powder, or any combination thereof, the inorganic filler selected from talc, calcium carbonate, wollastonite, and kaolinite, or any combination thereof, and the coupling agent being a silane resin or modified maleic anhydride resin.

13. The method according to claim 10, wherein at the coating, a mold is used for depositing the synthetic resin coating solution on the outer surface of the metallic material.

14. The method according to claim 10, wherein at the coating, the synthetic resin coating solution is deposited on the outer surface of the metallic material to form a thickness of 0.5 to 7.0 mm.

15. The method according to claim 10, wherein at the cooling, the resin-metal complex is cooled under an atmosphere of 5 to 50° C. for 0.5 to 10 minutes.

16. The method according to claim 10, further comprising embossing a pattern(s) on the surface of the resin-metal complex.

17. The method according to claim 10, wherein:
the outer surface of metallic material is process by the primer application, such that a primer is applied on the outer surface; and
the synthetic resin coating solution is applied on the primer and the outer surface of the metallic material.

18. The method according to claim 17, wherein the primer is a mixture of a thermosetting resin and a thermoplastic resin.

19. The method according to claim 18, wherein the primer includes 100 parts by weight of the thermosetting resin and 100 parts by weight of the thermoplastic resin.

20. A resin-metal complex, comprising:
a metallic material including a plasma treated outer surface; and
a synthetic resin combined with the metallic material, the synthetic resin including an olefin resin, a filler and a coupling agent,
wherein the metallic material is configured to have a cross section of a hollow circle shape, a hollow oval shape, a hollow triangle shape, a hollow square shape, a hollow pentagon shape, a hollow hexagon shape, a hollow heptagon shape, a ⌐ shape, a ⊏ shape, or an open polygon shape that has 3 to 10 vertexes,
wherein the cross section of the metallic material includes the plasma treated outer surface and an inner surface opposite to the plasma treated outer surface, the inner surface being apart from the plasma treated outer surface by a thickness of the metallic material, wherein the synthetic resin is coated on the plasma treated outer surface of the metallic material, without being coated on the inner surface, wherein the filler is at least one of an organic filler or an inorganic filler, the organic filler selected from wood flour, wood pellet, wood fiber, and paper powder, or any combination thereof, and the inorganic filler selected from talc, calcium carbonate, wollastonite, and kaolinite, or any combination thereof.

* * * * *